United States Patent [19]

Weinberg

[11] Patent Number: 5,357,817
[45] Date of Patent: Oct. 25, 1994

[54] WIDE BANDWIDTH STABLE MEMBER WITHOUT ANGULAR ACCELEROMETERS

[75] Inventor: Marc S. Weinberg, Needham, Mass.

[73] Assignee: Charles Stark Draper Laboratory, Inc., Cambridge, Mass.

[21] Appl. No.: 511,230

[22] Filed: Apr. 19, 1990

[51] Int. Cl.⁵ .............................. G01C 19/02
[52] U.S. Cl. ................... 74/5.34; 73/178 R; 73/505; 364/453; 364/434
[58] Field of Search ............ 364/453, 434; 73/178 R, 73/505, 510, 517 B; 74/5.34

[56] References Cited

U.S. PATENT DOCUMENTS

| | | | |
|---|---|---|---|
| Re. 32,931 | 5/1989 | Staudte | 73/505 |
| Re. 33,479 | 12/1990 | Juptner et al. | 73/505 |
| 3,696,429 | 10/1972 | Tressa | 343/180 |
| 3,790,766 | 2/1974 | Brown | 364/453 |
| 4,122,448 | 10/1978 | Martin | 343/7.7 |
| 4,144,764 | 3/1979 | Hartzell, Jr. | 73/497 |
| 4,155,257 | 5/1979 | Wittke | 73/497 |
| 4,244,215 | 1/1981 | Merhav | 73/504 |
| 4,275,605 | 6/1981 | Kennel | 73/504 |
| 4,336,718 | 6/1982 | Washburn | 73/517 B |
| 4,384,487 | 5/1983 | Browning | 73/517 B |
| 4,414,852 | 11/1983 | McNeill | 73/765 |
| 4,590,801 | 5/1986 | Merhav | 73/510 |
| 4,651,075 | 3/1987 | Hobbs et al. | 73/517 B |
| 4,727,752 | 3/1988 | Peters | 73/517 AV |
| 4,735,506 | 4/1988 | Pavlath | 356/350 |
| 4,761,743 | 8/1988 | Wittke | 364/484 |
| 4,811,233 | 3/1989 | Lauro | 364/453 |
| 4,834,538 | 5/1989 | Heeks et al. | 356/350 |
| 4,898,032 | 2/1990 | Voles | 73/505 |
| 4,922,756 | 5/1990 | Henrion | 73/517 R |
| 4,929,860 | 5/1990 | Hulsing, II et al. | 310/366 |
| 4,981,359 | 1/1991 | Tazartes et al. | 356/350 |
| 5,090,809 | 2/1992 | Ferrar | 356/350 |
| 5,094,537 | 3/1992 | Karpinski, Jr. | 356/350 |
| 5,138,883 | 8/1992 | Paquet et al. | 73/504 |
| 5,205,171 | 4/1993 | O'Brien et al. | 73/517 B |
| 5,226,321 | 7/1993 | Varnham et al. | 73/505 |
| 5,233,874 | 8/1993 | Putty et al. | 73/517 AV |
| 5,241,861 | 9/1993 | Hulsing, II | 73/505 |

Primary Examiner—David C. Cain
Attorney, Agent, or Firm—Weingarten, Schurgin, Gagnebin & Hayes

[57] ABSTRACT

A three axis, single degree of freedom gyroscope based rate sensing platform has restraining torque developed for the platform from a feedback loop that includes electronics that decouples individual gyroscope outputs from the rate inputs that correspond to axes other than the input axis for that gyroscope and provides an enhanced frequency response. The outputs from the various gyroscopes are processed in a compensator that estimates the platform rates on independent axes using either a Kalman filter estimator or a matrix inverse of the matrix equation of motion between platform input rate and gyroscope output. High bandwidth performance is obtained by an increased stiffness and prefiltering of the gyro torque inputs.

19 Claims, 3 Drawing Sheets

WIDE BANDWIDTH STABLE MEMBER WITHOUT ANGULAR ACCELEROMETERS

FIELD AND BACKGROUND OF THE INVENTION

The present invention relates to three axis, single degree of freedom inertial sensors using three orthogonally placed gyroscopes strapped down on an inertial platform. Such systems also typically have a limited bandwidth in the absence of angular accelerometers. That bandwidth is typically a small fraction of the ratio of gryo angular momentum to platform inertia.

The use of angular accelerometers adds bulk, weight and complexity that is undesirable, limiting their capability in weight limited applications including navigation and precision pointing and tracking.

SUMMARY OF THE INVENTION

According to the teaching of the present invention an inertial platform is provided having three orthogonally arrayed single degree of freedom gyroscopes in a gimballed configuration with a wide bandwidth response and stability over that wide bandwidth. In order to realize a wide bandwidth in the response of the inertial system, the feedback signals from each gyroscope are decoupled to permit separation of the feedback torquing for each axis and permit the realization of a higher frequency response without destabilizing poles in the response transfer function.

In preferred implementation, the platform stabilization loop for restraining platform rotation includes a decoupler using a platform rate estimator which develops a separate torque output for each axis despite the presence of crosscoupling that is inherent in single degree of freedom gyro rate sensors. The estimator is realized in a first embodiment using a decoupling based on a matrix inverse of the matrix transfer function relating gyro output to platform rate. A second embodiment uses a Kalman filter predictor and an optimal regulator.

With the stabilization loop signals separated into axis independent components, single degree of freedom transfer function processing can be applied to each signal with a high bandwidth, substantially above the frequency defined by the ratio of gyro angular momentum to platform inertia.

Prefiltering of gyro torque signals is provided to accommodate high platform rates. An integrated gyro output is provided in the Kalman predictor and regulator for increased stiffness and higher response rate.

DESCRIPTION OF THE DRAWING

These and other features of the present invention are more fully described in the following solely exemplary detailed description and in the accompany drawing of which.

DETAILED DESCRIPTION OF THE INVENTION

The present invention contemplates a gimballed or magnetically supported inertial navigation system having three axially independent, platform mounted gyroscopes and a stabilization loop for the gyroscope platform which has a wide band dynamic response achieved by decoupling the various axes in the feedback loop.

Figure 1:
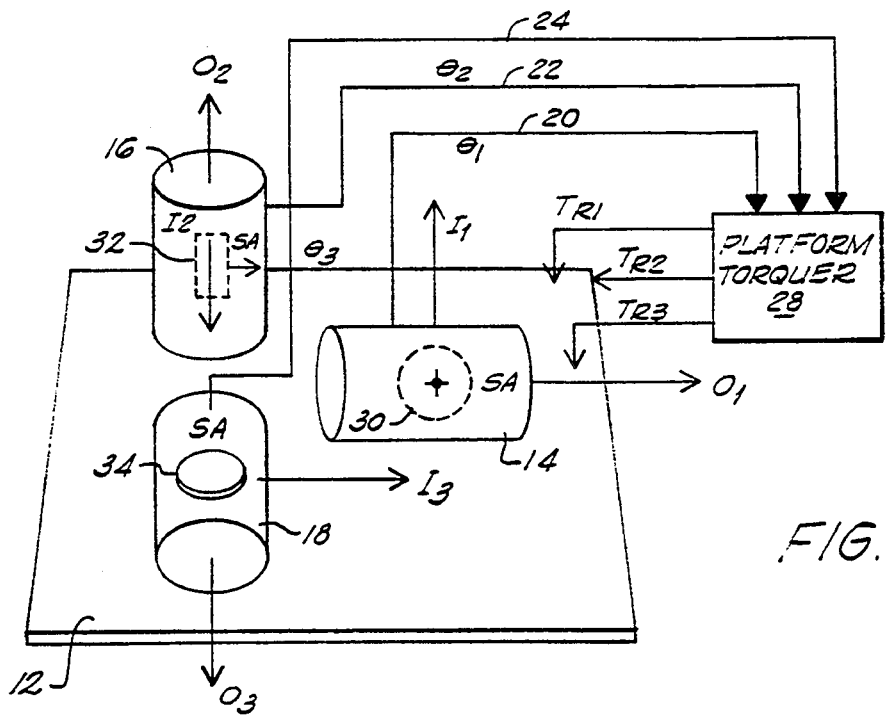
FIG. 1 is a block diagram of the present invention.

In particular and by reference to FIG. 1 there is shown an inertial platform 12 as is known in the art having first second and third gyroscopes 14, 16 and 18 each oriented with its input, output and spin axis in mutually orthogonal directions to provide three axis inertial rate sensing. Each gyro provides a respective output 20, 22 and 24 which is used in a stabilization loop 26 to generate torque control signals to a platform torquer 28 which operates to restrain the rotation of the platform 12.

The rate at which the system can respond to input rotation rates is limited by the dynamics of the gyro and the platform itself. In particular, each gyro 14, 16 and 18 has associated with it a rotating wheel 30, 32 and 34 which has an associated angular momentum (H). The gyroscope output axis inertia (I) is an additional factor bearing on system response. As a practical matter most systems, particularly in the absence of angular accelerometers, have difficulty achieving a bandwidth or frequency response which is much greater than a small fraction, typically $\frac{1}{4}$, of the ratio H/I. Above this frequency, instabilities are encountered which cannot readily be removed by the present stabilization loop because a three axis solution is required.

Figure 2:
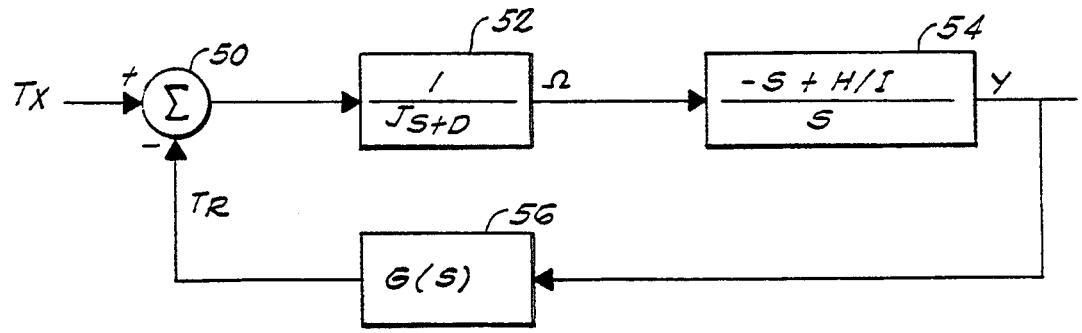
FIG. 2 is a block diagram of a single axis gyroscope stabilization loop according to this invention.

FIG. 2 illustrates the dynamics of a closed loop gyro system in which an external torque (Tx) is balanced by a restraint torque (Tr) as conceptionally represented by a summer 50 reflecting the torque provided by a platform torquer 28. The small but non-zero net output, necessary to drive the feedback stabilization loop, is modeled as a platform or stable member response represented by a module 52 and its S-plane transfer characteristic as shown. From the platform response a parameter representing platform rate is applied to a module 54. Module 54 represents the dynamic effect of a multi-axis decoupler (FIG. 3) on a decoupled single axis loop. The resulting output, a gyro output signal representing the response of the gyro and platform together, is applied through a feedback system represented by a module 56 having the transfer characteristics G(s) to establish the platform stabilizing torque.

The relation between the three gyro outputs and three platform rates is shown below. The three gyros are oriented on the platform as shown in FIG. 1. The output axis of gyro 14 is along axis 1 while the input axis is along axis 2, and so forth for the other axes. The outputs of the three gyros which are assumed identical are related to the three platform rates by:

$$(Is + c)\vec{\theta} = \begin{bmatrix} -Is & H_1 & 0 \\ 0 & -Is & H_2 \\ H_3 & 0 & -Is \end{bmatrix} \vec{\Omega} \quad (1)$$

where: $\rightharpoonup$ is a vector designator s = Laplace transform of d/dt
$\theta$ = float angle with respect to case
$\Omega$ = platform rate with respect to inertial space
I = output axis inertia
H = angular momentum ($H_1 = H_2 = H_3 = H$)
C = output axis damping
M = torques applied to the gyro The output $\theta$, of gyro 1 depends not only on $\Omega_2$ but also $\Omega_1$. Overcoming this limitation is a feature of the invention. Rotating the gyro does not change the conclusions, only the sign of the compensator.

The gyro outputs are given by:

$$\vec{\theta}_O = \vec{\theta} + \vec{\theta}_N \tag{2}$$

where
$\theta_O$ = gyro outputs
$\theta_N$ = gyro SG noise

The platform is modeled as linear with constant inertia and damping which are identical for the three axes. Results do not change qualitatively with unequal inertias and damping. The linearity assumption implies either small platform rates or symmetric platforms. The friction model is reasonably valid with stiction modeled as a disturbance torque. The platform motion is described by:

$$\vec{T}_X + \vec{T}_R = (Js + D)\vec{\Omega} \tag{3}$$

where
J = platform inertia
D = platform damping
$T_X$ = external torques applied to platform
$T_R$ = torques applied to platform by controller
Subscripts 1, 2, 3 indicate components of vectors.

As the platform rotates with respect to the case, the torques in stable member coordinates will require transformation to the axes of the torquers. This is presently done for low bandwidth systems. The present invention focuses on decoupling the three axis gyro dynamics; however, the coordinate transformations from torquer to platform axes are assumed.

Because the output of any individual gyro will be a function not only of input rates about its input axis, but in a three dimensional system, rates applied about the input axis of the other gyros as well, the feedback control to re-torque the platform to an inertially restrained position becomes a complex multi-dimensional problem. Present controllers, which are designed by assuming that the controller for each axis can be designed independently, preclude solutions which permit stabilization substantially above the indicated narrow bandwidth (H/4I) referenced above.

Figure 3:
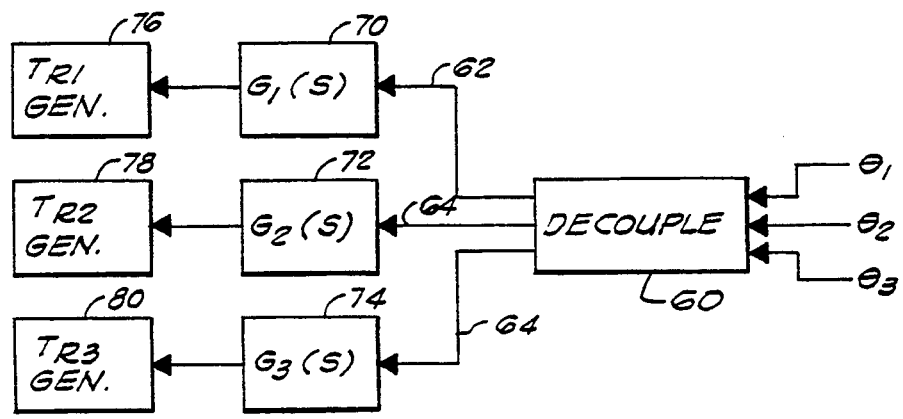
FIG. 3 is a block diagram a feedback loop for decoupled and enhanced frequency response according to the invention.

According to the present invention, and as illustrated in FIG. 3, a platform stabilization loop is indicated in which the output of the various gyros represented as $\theta_1$, $\theta_2$, $\theta_3$, are applied first through a decoupling network 60 which provides outputs which represent rate inputs solely about 1 of 3 orthogonal axes. These three outputs 62, 64, and 66 are in turn applied to separate, single axis electronics 70, 72, and 74, each of which provides independent three axis torque control to respective torque generators 76, 78 and 80 coupled to torque the platform 12.

The decoupling network 60 can take various forms and may be analog or digital. In one version the decoupling network 60 provides a transformation corresponding to the matrix inverse of the matrix transfer function relating platform rates to gyro output signals. Such a transfer function is represented as follows:

$$\frac{\vec{\Omega}}{s} = \frac{\begin{bmatrix} I^2s^2 & sIH & H^2 \\ H^2 & I^2s^2 & sIH \\ sIH & H^2 & I^2s^2 \end{bmatrix}(Is+c)\vec{\theta}}{I^3(-s+H/I)[s^2+sH/I+(H/I)^2]} \tag{4}$$

where $\Omega$ is platform rate and $\theta$ is gyro output.

The denominator in this equation has a pole at (H/I); hence, this compensator cannot be constructed. The term (−S+H/I) is eliminated from the transfer function of the decoupler 60 without sacrificing the decoupling function in order to increase the stable bandwidth of the system 60. The resulting decoupler is $$\frac{\vec{\Omega}}{s} = \frac{\begin{bmatrix} I^2s^2 & sIH & H^2 \\ H^2 & I^2s^2 & sIH \\ sIH & H^2 & I^2s^2 \end{bmatrix}(Is+c)\vec{\theta}}{I^3[s^2+sH/I+(H/I)^2]} \tag{5}$$

After inserting the decoupler (60) into the controller as illustrated in FIG. 3, the control problem becomes three single loop problems as shown in FIG. 2. For compensators G(s) (56, 70, 72, 74) which contain a single integrator, the bandwidth of the individual loops can be extended to 2 to 3 times the conventional designs. This greater bandwidth reduces low frequency errors by a factor of ten.

Figure 4:
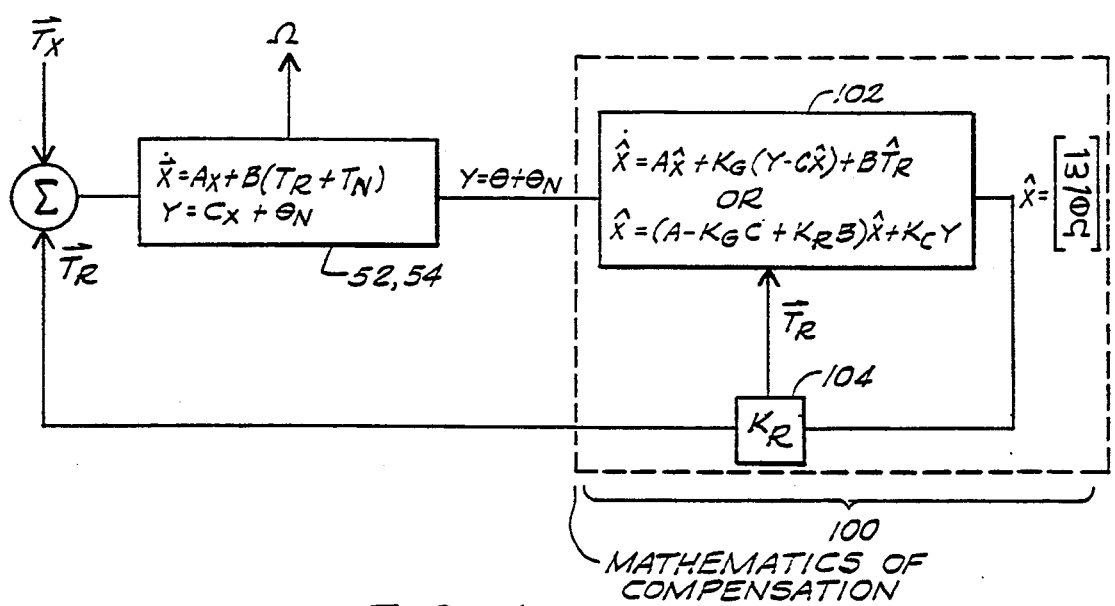
FIG. 4 is a block diagram of an alternative implementation of the decoupled, enhanced frequency response feedback according to the invention.

In an alternative implementation, and as represented by FIG. 4, digital or analog computer processing uses a Kalman filter estimator, in lieu of the platform rate estimator in analog form represented by the above network 60.

As shown there the feedback compensation includes a network 100 in which a Kalman filter 102 is provided having the form shown where the statespace gyro and platform dynamics are as follows:

$$\dot{\vec{X}} = A\vec{x} + B\vec{u}$$

$$\vec{x}_{(9\times 1)} = \begin{bmatrix} \vec{\omega} \\ \vec{\theta} \\ \vec{\Omega} \end{bmatrix} \quad \vec{u} = \begin{bmatrix} \vec{M} \\ \vec{T}_X + \vec{T}_R \end{bmatrix}$$

$\vec{\omega}$ = angular rate of gyro float with respect to inertial space.
$\vec{M}$ = gyro torque
$Y = \vec{\theta} + \vec{\theta}_N$ = Input to platform controller to restrain $$A = \begin{bmatrix} -C/I & 0 & 0 & & C/I & H/I & 0 \\ 0 & -C/I & 0 & & 0 & C/I & H/I \\ 0 & 0 & -C/I & & H/I & 0 & C/I \\ \hline 1 & 0 & 0 & & -1 & 0 & 0 \\ 0 & 1 & 0 & 0\,(6\times 3) & 0 & -1 & 0 \\ 0 & 0 & 1 & & 0 & 0 & -1 \\ \hline & & & & -D/J & 0 & 0 \\ & 0\,(3\times 6) & & & 0 & -D/J & 0 \\ & & & & 0 & 0 & -D/J \end{bmatrix}$$

-continued $$B = \left[\begin{array}{ccc|ccc} 1/I & 0 & 0 & & 0\,(3\times 3) & \\ 0 & 1/I & 0 & & & \\ 0 & 0 & 1/I & & & \\ \hline & & 0\,(3\times 6) & & & \\ \hline 0\,(3\times 3) & & & 1/J & 0 & 0 \\ & & & 0 & 1/J & 0 \\ & & & 0 & 0 & 1/J \end{array}\right]$$

The Kalman filter's output is a vector $\hat{x}$ which estimates $[\vec{\omega}\ \vec{\theta}\ \vec{\Omega}]^T$. The state estimate $\hat{x}$ is fed into the optimal regulator 104 which determines the torques to drive the platform. FIG. 4 illustrates a generalized block diagram for the three axes.

The Kalman filter samples the gyro outputs and estimates the states $\hat{x}$ an increment of time after the sample time. The real time sampled gyro outputs are compared to the filter's predicted outputs (the term Cx in the filter) which require knowledge of the platform torques $T_R$, which are sent to the filter. This difference then drives a model of the gyro and platform system (the matrices A and B).

Figure 5:
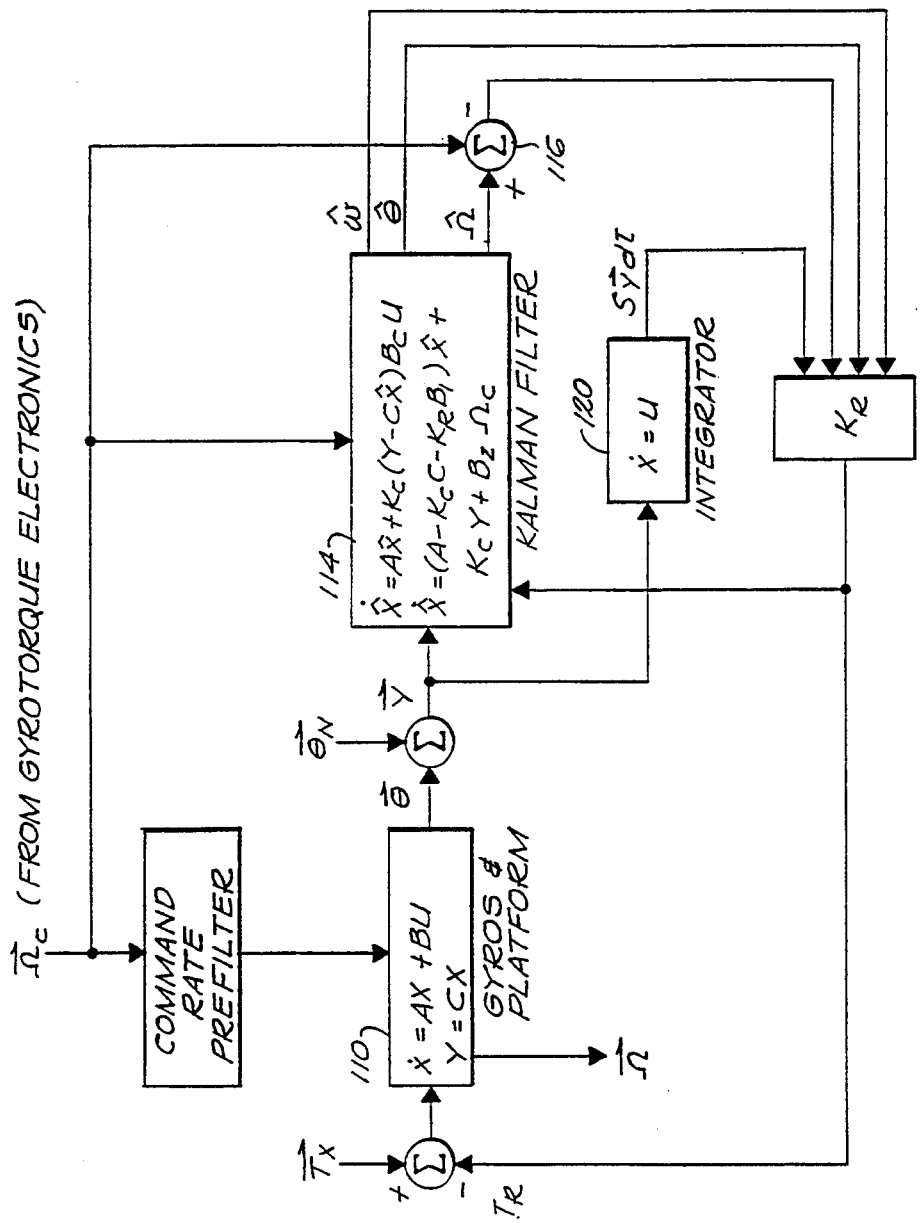
FIG. 5 is a block diagram of a modification to the embodiment of FIG. 4.

In a further embodiment of the invention illustrated in FIG. 5, a prefiltering of and generation of command torques to the gyro torquers, distinct from the platform torquers, but derived from command rates that the platform should receive for stabilization in accordance with the following matrix function, is implemented by the prefilter. This prefiltering facilitates the platform in following higher rates.

$$\vec{M}_c(s) = \left[\begin{array}{ccc} -\hat{I}s & \hat{H} & 0 \\ 0 & -\hat{I}s & \hat{H} \\ \hat{H} & 0 & -\hat{I}s \end{array}\right]\Omega_c(s)$$

Where:
$M_c(s)$ = the command torques applied to the gyro;
$\Omega_c(s)$ = the command rates that should be applied to the gyros for stabilization; and $\wedge$ indicates estimated values. The factor M(s) is then added to the right in equation (1) above.

In the embodiment of FIG. 5 the gyro platform 50 provides an output of gyro signal generator signals to an imaginary summer 112 where it is combined with signal generator noise. The represented output, $\vec{Y}$ is applied to a Kalman filter 114 which provides the digital estimating of the state variables $\omega$, $\theta$ and $\Omega$. The platform rate signal is differenced with the command rate the platform should move in a summer 116. The result, along with tile estimates, is applied to an optimal regulator 118 to correct the gains of the Kalman filter 114. The output of the regulator 118 is used to provide the platform torque.

The output of the gyros is also applied through an integrator 120 and tile integral is applied to the regulator 118. The integrator 120 provides a stiffness increase that reduces the influence of external disturbances applied to the stable member (12).

The gains of the Kalman filter and of the regulator are selected to optimize the performance of the closed loop system. Compensators (114, 118) which utilize the optimal approach and the integrator for additional stiffness (120) can increase platform bandwidth four to five times over the present, conventional designs. This decreases low frequency tracking errors by factors of 50 to 100.

The above described system is intended as exemplary only, it being understood that other forms for decoupling the axis may be utilized, permitting a wide bandwidth three axis platform inertial sensor. Accordingly the scope of the invention is intended to be limited only in accordance with the following claims.

I claim:

1. A high bandwidth three axis inertial sensor having three single degree of freedom gyroscope rate sensors comprising:
   a platform having first, second and third single degree of freedom rate sensing gyroscopes fixed to the platform with their respective spin, input and output axes fixed to the platform in mutually orthogonal directions;
   said first, second and third gyroscopes having respective output signals representative of rate inputs about the corresponding gyroscope input axis in combination with outputs corresponding to angular accelerations about other axes;
   means responsive to the outputs of said gyrsoscopes for applying torque to said platform about three axes each corresponding to an input axis of a corresponding gyroscope to minimize motion in response to rate inputs to said platform; and
   said torque applying means including means for developing each axis of torque in a manner that each axis of torque is compensated for the rates corresponding to inputs about other axes of rate input.

2. The sensor of claim 1 wherein said developing means includes estimating means for providing an estimate representative of the rate inputs to the platform independent of the other rate inputs.

3. The sensor of claim 2 wherein said estimating means includes means for implementing a matrix proportional to the inverse of the matrix relating three dimensional platform rate inputs to gyroscope outputs.

4. The sensor of claim 3 wherein said estimating means includes a Kalman filter.

5. The sensor of claim 1 further including an optimal regulator for generating torque applied to the platform.

6. The sensor of claim 1 wherein said developing means includes means for providing a response bandwidth beyond the frequency defined by the ratio of the angular momentum of the gyroscope to the inertia about the output axis.

7. The sensor of claims 1, 4 or 5 further including means for prefiltering a signal used to torque individual gyroscopes as a function of platform rates to increase platform bandwidth at which said sensor is able to process angular rates for a stabilized platform.

8. The sensor of claims 1, 4 or 5 further including means for causing the applied torque to reflect the integral of the gyro output signals.

9. Three axis inertial apparatus having three single degree of freedom gyroscope rate sensors comprising:
   a platform having first, second and third single degree of freedom rate sensing gyroscopes fixed to the platform with their respective spin, input and output axes fixed to the platform in mutually orthogonal directions and each having gyro torque applying means;
   said first, second and third gyroscopes having respective output signals representative of rate inputs about the corresponding gyroscope input axis in combination with outputs corresponding to rates about other axes;

estimating means for providing an estimate of the rate inputs to the platform independent of the other rate inputs;

means responsive to the outputs of said estimator for applying torque to said platform about three axes each corresponding to an input axis of a corresponding gyroscope to minimize motion in response to rate inputs to said platform; and prefilter means responsive to a command rate and coupled to the gyro torque applying means for enabling the platform to move with respect to inertial space.

10. The apparatus of claim 9 wherein said estimating means includes a Kalman filter.

11. The apparatus of claim 9 further including an optimal regulator defining Kalman filter gains.

12. The apparatus of claims 9 or 10 further including means for causing the applied torque to reflect the integral of the gyro output signals.

13. Three axis inertial apparatus having three single degree of freedom gyroscope rate sensors comprising:

a platform having first, second and third single degree of freedom rate sensing gyroscopes fixed to the platform with their respective spin, input and output axes fixed to the platform in mutually orthogonal directions;

said first, second and third gyroscopes having respective output signals representative of rate inputs about the corresponding gyroscope input axis in combination with outputs corresponding to rates about other axes;

means responsive to the outputs of said gyroscopes for applying torque to said platform about three axes each corresponding to an input axis of a corresponding gyroscope to minimize motion in response to rate inputs to said platform; and said torque applying means including means for developing each axis of torque compensated by the integral of the gyroscope output signals.

14. The apparatus of claim 13 wherein said estimating means includes means for implementing a matrix proportional to the inverse of the matrix relating three dimensional platform rate inputs to gyroscope outputs.

15. The apparatus of claim 14 wherein said estimating means includes means for implementing a matrix proportional to the inverse of the matrix relating three dimensional platform rate inputs to gyroscope outputs.

16. The apparatus of claim 15 wherein said estimating means includes a Kalman filter.

17. The apparatus of claim 16 further including an optimal regulator defining Kalman filter gains.

18. The apparatus of claim 13 wherein said developing means includes means for providing a response bandwidth beyond the frequency defined by the ratio of the angular momentum of the gyroscope to the inertia about the output axis.

19. Three axis inertial apparatus having three single degree of freedom gyroscope rate sensors comprising:

a platform having first, second and third single degree of freedom rate sensing gyroscopes fixed to the platform with their respective spin, input and output axes fixed to the platform in mutually orthogonal directions;

said first, second and third gyroscopes having respective output signals representative of rate inputs about the corresponding gyroscope input axis in combination with outputs corresponding to angular accelerations about other axes;

means responsive to the outputs of said gyroscopes for applying torque to said platform about three axes each corresponding to an input axis of a corresponding gyroscope to minimize motion in response to rate inputs to said platform; and said torque applying means including means for developing the applied torque to reflect the integral of the gyro output signals.

* * * * *

UNITED STATES PATENT AND TRADEMARK OFFICE
CERTIFICATE OF CORRECTION

PATENT NO. : 5,357,817
DATED : October 25, 1994
INVENTOR(S) : Marc S. Weinberg

It is certified that error appears in the above-indentified patent and that said Letters Patent is hereby corrected as shown below:

Column 4, Equation (5), on the left side (before the = sign),

" $\dfrac{\vec{\hat{\Omega}}}{s}$ " should read -- $\dfrac{\hat{\Omega}}{s}$ --.

Column 4, lines 52-54,

" $\begin{bmatrix} \vec{\omega} \\ \theta \\ \vec{\Omega} \end{bmatrix}$ " should read -- $\begin{bmatrix} \vec{\omega} \\ \theta \\ \vec{\Omega} \end{bmatrix}$ --.

Column 5, line 35, on the right side of the equation " $\Omega_c(s)$ " should read -- $\vec{\Omega}_c(s)$ --.

Column 5, line 54, "tile estimates" should read --the estimates--.

UNITED STATES PATENT AND TRADEMARK OFFICE
CERTIFICATE OF CORRECTION

PATENT NO. : 5,357,817
DATED : October 25, 1994
INVENTOR(S) : Marc S. Weinberg

It is certified that error appears in the above-indentified patent and that said Letters Patent is hereby corrected as shown below:

Column 5, line 59, "tile integral" should read --the integral--.

Signed and Sealed this

Second Day of July, 1996

Attest:

BRUCE LEHMAN

*Attesting Officer*  *Commissioner of Patents and Trademarks*